United States Patent
Erickson et al.

(10) Patent No.: US 6,452,291 B1
(45) Date of Patent: Sep. 17, 2002

(54) REDUCTION OF SWITCHING TRANSIENTS VIA LARGE SIGNAL/SMALL SIGNAL THRESHOLDING

(75) Inventors: Mark Erickson, Sunnyvale, CA (US); Thorkell Gudmundsson, San Jose, CA (US); Pradeep Pandey, San Jose, CA (US)

(73) Assignee: Voyan Technology, Santa Clara, CA (US)

( * ) Notice: Subject to any disclaimer, the term of this patent is extended or adjusted under 35 U.S.C. 154(b) by 0 days.

(21) Appl. No.: 09/348,883

(22) Filed: Jul. 1, 1999

(51) Int. Cl.$^7$ ................................. F02D 31/00
(52) U.S. Cl. ................ 307/131; 703/94; 180/170
(58) Field of Search ................ 180/170, 176, 180/179; 701/93, 94, 110, 95, 96; 307/116, 125, 131

(56) References Cited

U.S. PATENT DOCUMENTS

| | | | | |
|---|---|---|---|---|
| 4,006,590 A | * | 2/1977 | Itoh | 60/39.281 |
| 4,088,899 A | * | 5/1978 | Miller et al. | 307/116 |
| 4,446,940 A | * | 5/1984 | Sakakibara | 180/177 |
| 4,650,020 A | * | 3/1987 | Mizumo et al. | 701/94 |
| 4,849,892 A | * | 7/1989 | McCombie | 701/94 |
| 4,890,231 A | * | 12/1989 | Frantz | 701/97 |
| 4,905,153 A | * | 2/1990 | Suzuki et al. | 701/93 |
| 4,926,334 A | * | 5/1990 | Suzuki et al. | 701/93 |
| 5,048,631 A | * | 9/1991 | Etoh | 701/96 |
| 5,392,215 A | * | 2/1995 | Morita | 29/888.022 |
| 5,665,026 A | * | 9/1997 | Linden | 477/108 |
| 5,689,422 A | * | 11/1997 | Heymann et al. | 701/93 |
| 5,731,977 A | * | 3/1998 | Taniguchi et al. | 701/93 |
| 5,862,791 A | * | 1/1999 | Schoenfelder et al. | 123/357 |
| 5,872,694 A | * | 2/1999 | Hoinkis et al. | 361/234 |
| 5,886,865 A | * | 3/1999 | Parkhe et al. | 361/234 |
| 6,044,321 A | * | 3/2000 | Nakamura et al. | 701/96 |
| 6,167,341 A | * | 12/2000 | Gourmelen et al. | 701/93 |
| 6,186,925 B1 | * | 2/2001 | Bellinger | 477/175 |
| 6,192,309 B1 | * | 2/2001 | Prestl et al. | 701/93 |

* cited by examiner

*Primary Examiner*—Brian Sircus
*Assistant Examiner*—Roberto J. Rios
(74) *Attorney, Agent, or Firm*—Blakely, Sokoloff, Taylor & Zafman LLP

(57) ABSTRACT

The present invention includes a method and system for reducing switching transients via large signal/small signal thresholding. The present invention prevents a switch from occurring if when the system (i.e., the system under control) is in small signal mode and permits switches to occur when the system is in large signal mode. Large signal and small signal modes are determined by comparing the difference between the most current value of a comparator variable and the final setpoint with a threshold distance. The system is in small signal mode if the most current value of the comparator variable less the final setpoint value is less than the threshold distance. Otherwise, the system is in large signal mode.

37 Claims, 4 Drawing Sheets

REDUCTION OF SWITCHING TRANSIENTS VIA LARGE SIGNAL/SMALL SIGNAL THRESHOLDING

BACKGROUND OF THE INVENTION

1. Field of the Invention

The present invention pertains to the field of controllers and models. More specifically, the present invention relates to controller switching at threshold regions.

2. Background Information

Often when working with processes or machinery there are points at which a particular portion of the process, a particular machine, or a controller for the process or machine switches from one mode to another. Two examples are automotive engines with turbochargers and semiconductor reactors that must operate over wide temperature ranges. These examples are discussed further below so that a clear understanding of thresholds and switching may be understood. It should be noted that these are merely examples of when switching may occur and are not meant to be limiting.

In the example of a turbocharged automotive engine, there is typically a certain velocity or acceleration threshold below which the turbocharger is inactive and above which the turbocharger is activated. As the car decelerates there is a certain threshold above which the turbocharger is active and below which the turbocharger deactivated. (Generally, the threshold for activating and deactivating the turbocharger are one and the same, although this does not necessarily have to be the case.) Thus, at this threshold the engine activates or deactives the turbocharger. This threshold may be a certain speed, a certain engine rpm, a certain acceleration level, a certain throttle position, etc. Typically, if the engine is operated so that the turbocharger is repeatedly and rapidly activated and deactivated, the turbocharger or other engine components may suffer excessive wear or become damaged. In addition, the driving experience may be poor due to transient acceleration (bumps or lurches) associated with activating or deactiving the turbocharger. If the driver or a cruise control system is attempting to maintain a constant speed or acceleration, repeated turbocharger transitions from active to inactive may make the constant speed or acceleration difficult or impossible to maintain.

Consider the cruise control case. When using cruise control a driver sets a particular speed to maintain. For example, this speed may be 70 miles per hour (mph), and is called a setpoint speed. In this example the activation threshold of the turbocharger is based upon speed and the threshold is 68 mph. As the car accelerates to reach and maintain the desired speed of 70 mph the turbocharger activates when the car reaches 68 mph. When the cruise control is maintaining a speed of 70 mph the turbocharger is active. With the setpoint speed set to 70 mph, when the car encounters a hill the cruise control system allows the car to decelerate to 67 mph before the cruise control accelerates the car back up to the 70 mph speed. In such an example the car will decelerate below the turbocharger threshold (68 mph) and the turbocharger will deactivate. Once the car decelerates to 67 mph then the cruise control will accelerate the car back up to 70 mph once again crossing the threshold (68 mph) and causing the turbocharger to activate again. The turbocharger activation will cause a transient acceleration, causing the car speed to increase to 73 mph. Since speed is above the setpoint speed of 70 mph, cruise control allows the car to decelerate, causing the turbocharger to deactivate again. Thus the interaction between the turbocharger switching and the cruise control cause the turbocharger to repeatedly activate and deactivate. The turbocharger and engine suffer excessive wear, and cruise control is unable to maintain a constant speed.

A similar example may be shown in a semiconductor process in a semiconductor furnace. In a wafer annealing process, wafers are placed into a semiconductor furnace and the furnace is heated to a desired temperature level for that particular annealing process (e.g., a setpoint temperature). To operate well over a wide temperature range, the example furnace uses several different controllers, each of which operates the furnace within specific temperature range. The boundaries that define the region within which each controller operates define the threshold temperatures. In other words, one controller will operate the furnace below the temperature threshold and another controller will operate the furnace at a temperature above the threshold. A furnace that must operate over a wide temperature range (e.g., several hundred degrees C) may have multiple controllers and multiple temperature ranges and therefore there may be multiple threshold temperatures.

FIG. 1 illustrates a graph of temperature ranges for a sample furnace. In the example illustrated in FIG. 1, controller 110 operates the furnace in the temperature range of 400–730° C., controller 120 operates the furnace in the temperature range of 730–830° C., and controller 130 operates the furnace in the temperature range of 830–1000° C. In this example the threshold temperature between controller 110 and controller 120 is 730° C. and the threshold temperature between controller 120 and controller 130 is 830° C. Thus, when the temperature of the furnace increases past 730° C. the furnace switches from controller 110 to controller 120 and when the temperature of the furnace increases past 830° C. the furnace switches from controller 120 to controller 130.

In the furnace example, the anneal process requires a temperature near the threshold voltage, for example 735° C. To reach 735° C., the furnace must ramp up past the threshold voltage in order to reach the anneal temperature. Thus, in order to reach the anneal temperature (735° C.) controller 110 will control the furnace until 730° C. is reached and then the controllers will switch so that controller 120 will control the furnace from 730° C. to 735° C. The problem with this, however, is that the process of switching between the controllers may cause a transient disturbance, or "bump," in the furnace temperature.

This bump may cause the temperature of the furnace to quickly raise a few degrees. As controller 120 takes over control of the furnace, is compensates for this bump, causing it to disappear after a short period of time. In this example, however, if the transient bump causes the furnace temperature to exceed the anneal temperature of 735° C. by even a few degrees, the anneal process accuracy may be adversely affected, thereby lowering the yield of working semiconductor devices being manufactured.

FIG. 2 illustrates an example of a temperature graph for a semiconductor furnace. The setpoint temperature that is programmed by the user is represented by line 210. In this example, line 210 represents how the temperature of the furnace will gradually increase and then level out at the desired temperature of 735° C. Line 220 illustrates a more realistic scenario of what the temperature within the furnace is likely to be.

Line 230 illustrates a gradual temperature increase to the threshold temperature (or switch temperature 280) of 730° C. At threshold temperature 280, however, the furnace switches controllers (at point 240) which causes a transient bump in temperature. In the example illustrated in FIG. 2, the transient bump causes furnace temperature 250 to cross back down below the threshold temperature so that the a controller switch takes place (at point 260). The switch to the controller that operates below the threshold temperature (at point 260) causes yet another transient bump 270 to a lower temperature from which the furnace temperature must again rise. Thus, in this example the furnace controllers to switch back and forth degrading the accuracy with which the controller can maintain the desired temperature of 735° C. This accuracy degradation degrades the performance and reliability of the furnace and quality with which it can perform the desired process.

Prior attempts to solve the problem of switching transients around a setpoint value require that the switchpoint be set/programmed far enough away from the setpoint that transient bumps do not affect the performance of the furnace near the desired setpoint. In the turbocharged engine example, this is not a good solution because it would require that the driver of the car have a mechanism for programming the switchpoint at which the turbocharger should activate. The increased complexity for the car driver is a serious drawback to such a scheme. This drawback is typically less of an issue for engineers who use semiconductor furnaces. However, if the furnace is used to perform many different processes requiring many different setpoint temperatures, then many different switching thresholds must be reprogrammed for the different setpoints, thus created possibly unacceptable complexity for the user.

What is needed is a method and system for reducing switching transients around threshold regions without requiring reprogramming of a system each time a setpoint or the process using a setpoint is changed.

SUMMARY OF THE INVENTION

The present invention includes a method and system for reducing switching transients via large signal/small signal thresholding. The present invention prevents a switch from occurring if when the system (i.e., the system under control) is in small signal mode and permits switches to occur when the system is in large signal mode. Large signal and small signal modes are determined by comparing the difference between the most current value of a comparator variable and the final setpoint with a threshold distance. The system is in small signal mode if the most current value of the comparator variable less the final setpoint value is less than the threshold distance. Otherwise, the system is in large signal mode.

Additional features and benefits of the present invention will become apparent from the detailed description, figures, and claims set forth below.

BRIEF DESCRIPTION OF THE DRAWINGS

The present invention is illustrated by way of example and not limitation in the accompanying figures in which.

DETAILED DESCRIPTION

A method and system for reducing switching transients via large signal/small signal thresholding are disclosed. In the following description, numerous specific details are set forth such as specific equipment, processes, parameters, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes a method and system for reducing switching transients via large signal/small signal thresholding. The present invention prevents a switch from occurring when the controller of the plant (i.e., the system being controlled) is in small signal mode and permits switches to occur when the controller is in large signal mode. Large signal and small signal modes are determined by comparing the difference between the most current value of a comparator variable and the final setpoint with a threshold distance. The controller is in small signal mode if the difference between the comparator variable and the final setpoint value is less than the threshold distance. Otherwise, the controller is in large signal mode.

Figure 1:
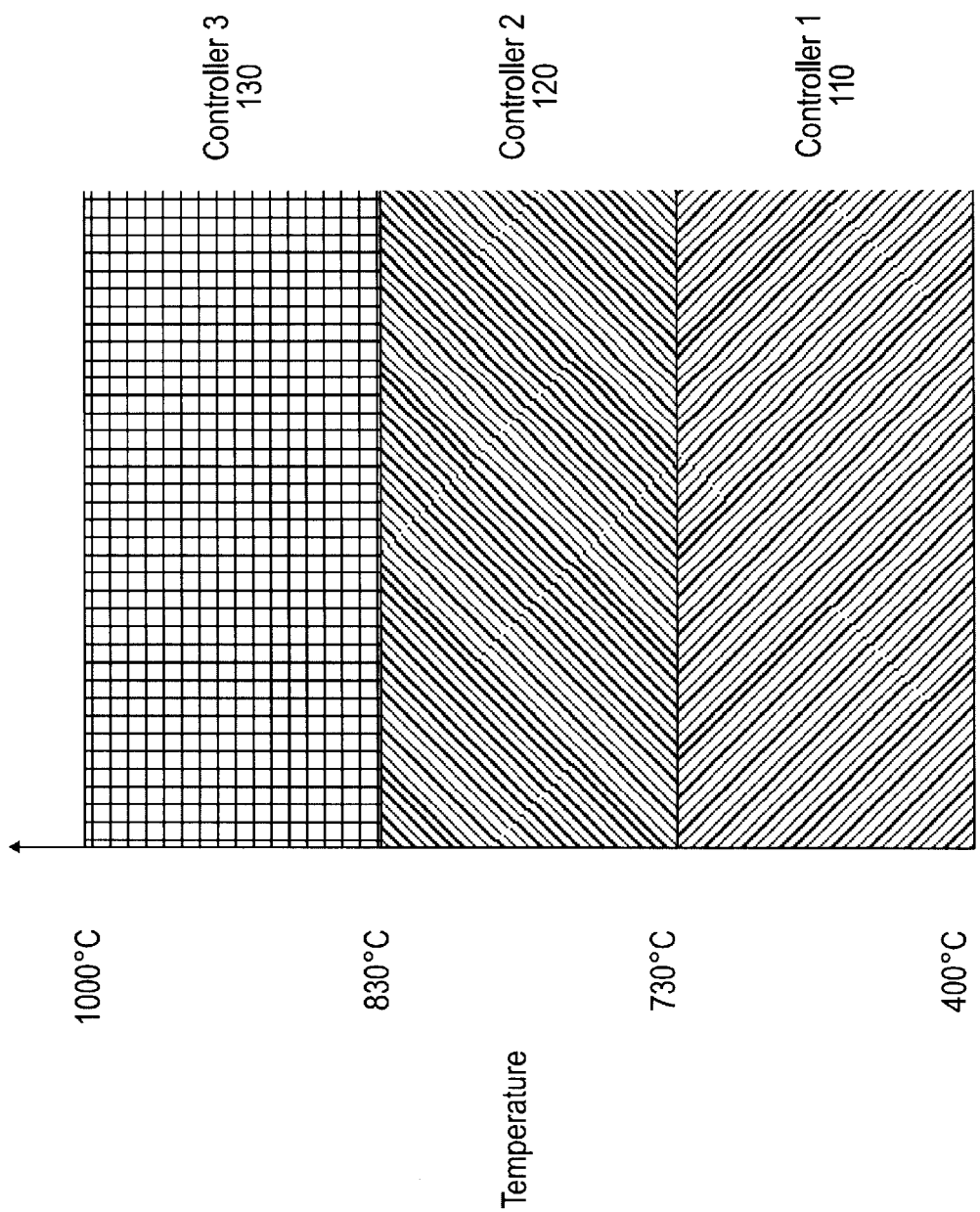
FIG. 1 illustrates a graph of temperature ranges for a sample furnace.
Figure 2:
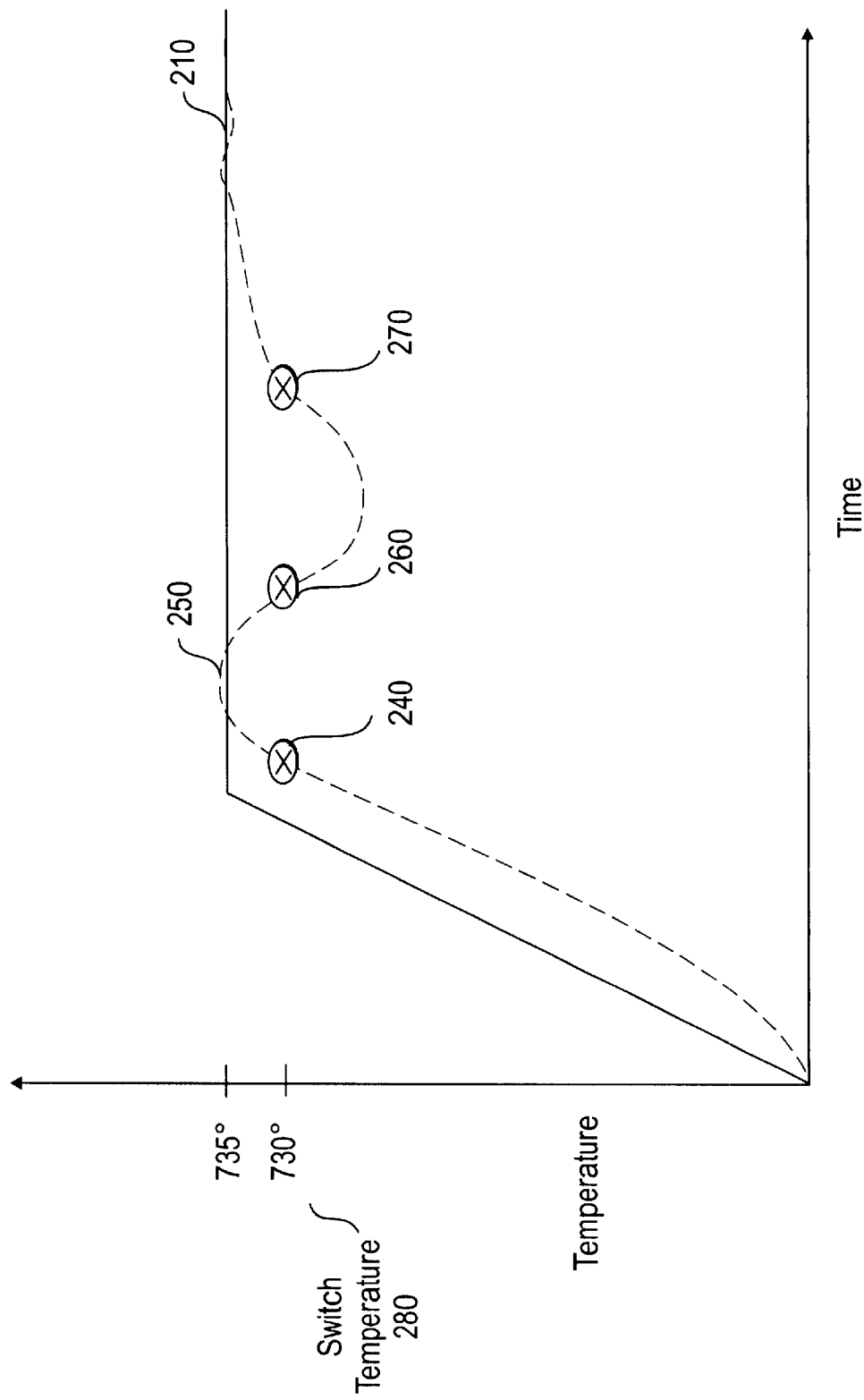
FIG. 2 illustrates an example of a temperature graph for a semiconductor furnace.
Figure 3:
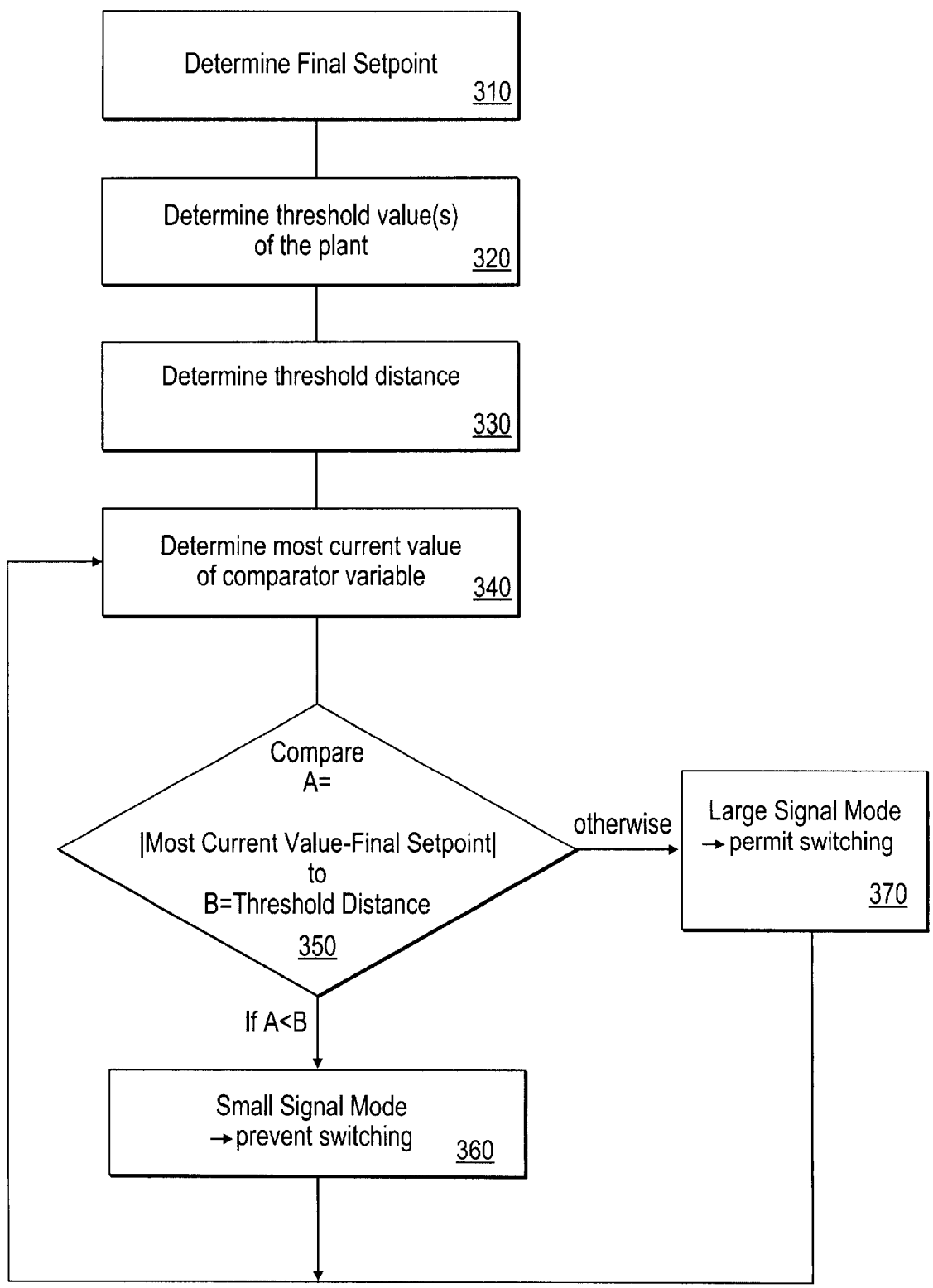
FIG. 3 illustrates a flow chart of one embodiment of the present invention.

FIG. 3 illustrates a flow chart of one embodiment of the present invention. It should be noted that the flow chart of FIG. 3 is merely meant to be demonstrative and that the steps included in the flow chart may follow many other orders and not just the order illustrated. At step 310, the final setpoint of the plant under control is determined. In the car example of the background section, the final setpoint is 70 mph which is the setpoint speed of the cruise control. In the semiconductor furnace example of the background section, the final setpoint is 735° C. which is the temperature setpoint of the anneal process.

At step 320, the threshold value(s) (or switchpoint(s)) of the plant are determined. In the car example of the background section, the threshold value is 68 mph which is the point at which the car enters turbo mode. In the semiconductor furnace example of the background section, the threshold value is 730° C. which is the threshold value between the temperature ranges of controller 110 and controller 120.

At step 330, a threshold distance is determined. The threshold distance is the distance (or range) from the threshold value within which it is not desired to have the switch occur. In one embodiment of the present invention the threshold distance is preprogrammed into the system. In another embodiment of the present invention the threshold distance is selected by the user and programmed into the system by the user.

It should be noted that in other embodiments of the present invention the threshold distance may or may not be changed depending upon the system being used. For example, the threshold distance in the car example will most likely be set by the manufacturer and is not likely to be changed. The manufacturer of the car, knowing that the cruise control will begin to accelerate the car approximately 3 mph (i.e., at 67 mph) below the final setpoint (i.e., 70 mph) may set the threshold distance at 5 mph. In other words the car will not enter turbo mode within 5 mph of the final setpoint. Thus, in the example given above, the turbo mechanism will not kick in when the speed of the car was between 65–75 mph (i.e., within 5 mph above and below 70 mph).

In the furnace example, the threshold distance may be set by the manufacturer of the furnace if the furnace is used for performing a specific process. In such a case, the manufacturer will set the threshold distance in much the same way as the manufacturer in the car example given above. However, if the furnace can be used for many different processes then it may be desirable for the user of the furnace to be able to set the threshold distance based upon the particular process being performed by the user. In the furnace example the user may set the threshold distance after monitoring the operation of the furnace and observing the effect of the transient bumps on the furnace.

For example, if a user observes that in a particular furnace the transient bumps cause temperature jumps (or spikes) in the range of 0–15° C, then the user may want to set the threshold distance to 20° C. in order to prevent switching within 20° C. of the final setpoint temperature. Thus in this example the controller 110 will not switch to controller 120 within 20° C. of 735° C. (i.e., within the range of 715–755° C.). Similarly, if the temperature is decreasing to a final setpoint controller 120 will not switch to controller 110 within the same threshold distance given above.

At step 340, the most current value of the comparator variable is determined. In the car example given above the comparator variable is speed and in the furnace example the comparator variable is temperature. In order to determine the most current value of the comparator variable the variable may be measured, estimated, predicted, observed, etc.

At step 350, it is determined whether the system is in small signal mode or large signal mode. This determination is made by doing a comparison and may be performed using either hardware, such as comparator circuitry, or software. The determination of whether the system is in small signal mode or large signal mode is performed by taking the difference between the most current value of a comparator variable (most current value) and the final setpoint programmed by the user and comparing the result to the threshold difference. Thus, the determination is made by taking the absolute value of the difference between the most current value of the comparator variable being controlled (most current value) and the final setpoint |most current value−final setpoint | and comparing that result to the threshold distance.

In one embodiment of the present invention the determination is made by using the variable under control as the comparator variable. Thus, the determination is made by taking the distance between the most current value of the variable being controlled (most current value) and the final setpoint |most current value−final setpoint | and comparing that result to the threshold distance.

It should be noted, however, that the comparator variable is not necessarily always the variable under control, but rather in other embodiments of the present invention the comparator variable may be a variable closely related to the variable under control. Thus, the determination is made by taking the distance between the most current value of a variable closely related to the variable under control (most current value) and the final setpoint |most current value−final setpoint | and comparing that result to the threshold distance. For example, in a furnace the variable under control may be the wafer temperature. The comparator variable may be either the wafer temperature or another related temperature within the furnace.

If the distance between the most current value and the final setpoint is less than the threshold distance (e.g., |most current value−final setpoint |<threshold distance) then the system is in small signal mode (step 360). Otherwise, the system is in large signal mode (step 370). If the system is in small signal mode 360 then the system will prevent switching from occurring thus reducing transient bumps that may affect the operation of the system near the final setpoint. If the system is in large signal mode 370 then the system will permit switching since the transient bumps will not greatly affect the operation of the system near the final setpoint.

In one embodiment of the present invention steps 340, 350, and/or 360 & 370 are repeated on an ongoing basis as the controller and plant (i.e., the system) operate. Thus, the determination of whether the system is in small signal mode or large signal mode may be an ongoing process during the operation of the system.

It should be noted that the comparisons may be made as greater than, less than, greater than or equal to, less than or equal to, etc. and that the embodiment described above is meant to be merely exemplary and not limiting. It should also be noted that the comparison given above is just one example of a comparison that may be made to determine small signal or large signal mode and that other computations may be used. Additionally, it should be noted that the designation of "less than" being small signal mode and preventing switching or "otherwise" being large signal mode and permitting switching is arbitrary and may be interchanged.

In the car example given above, if the threshold is 68 mph, the final setpoint is 70 mph, and the threshold distance is 5 mph, then as the car reaches the threshold and since the threshold is within the range of 65–75 mph the system is in small signal mode and switching into or out of turbo mode is prevented. Thus, using the present invention, the system avoids repeatedly transitioning into and out of turbo mode and saving wear and tear on the engine and turbo mechanism of the car. However, if the threshold is 68 mph, the final setpoint is 75 mph, and the threshold distance is 5 mph the threshold is not within the range of 70–80 mph. As the car reaches the threshold, the system is in large signal mode and the switch is permitted. In the example the cruise control begins to accelerate the car within 3 mph of the final setpoint. If the car decelerates, the cruise control will begin to accelerate the car at 72 mph which is after the car has already transitioned into turbo mode. Thus, the car will not be switching in and out of turbo mode.

In the furnace example given above, if the threshold is 730° C., the final setpoint is 735° C., and the threshold distance is 20° C. As the furnace temperature reaches the threshold and since the threshold is within the range of 715–755° C. the system is in small signal mode. Switching from controller 110 to controller 120 (or vice versa) is prevented. Thus, using the present invention, the system avoids transient bumps near the final setpoint and improving the integrity of the system and process being performed. However, if the threshold is 730° C., the final setpoint is 780° C., and the threshold distance is 20° C. the threshold is not within the range of 760–800° C. As the furnace temperature reaches the threshold, the system is in large signal mode and the switch is permitted. Even if a transient bump occurs and raises (or spikes) the temperature by 15° C. at the switchpoint (i.e., spike the temperature to 745° C.) the transient bump is not large enough or close enough to the final setpoint to affect the operation of the system near the final setpoint and the temperature will keep rising until it reached the final setpoint temperature (780° C.). Thus, the transient bumps caused from switching will not greatly affect the performance of the system.

Figure 4:
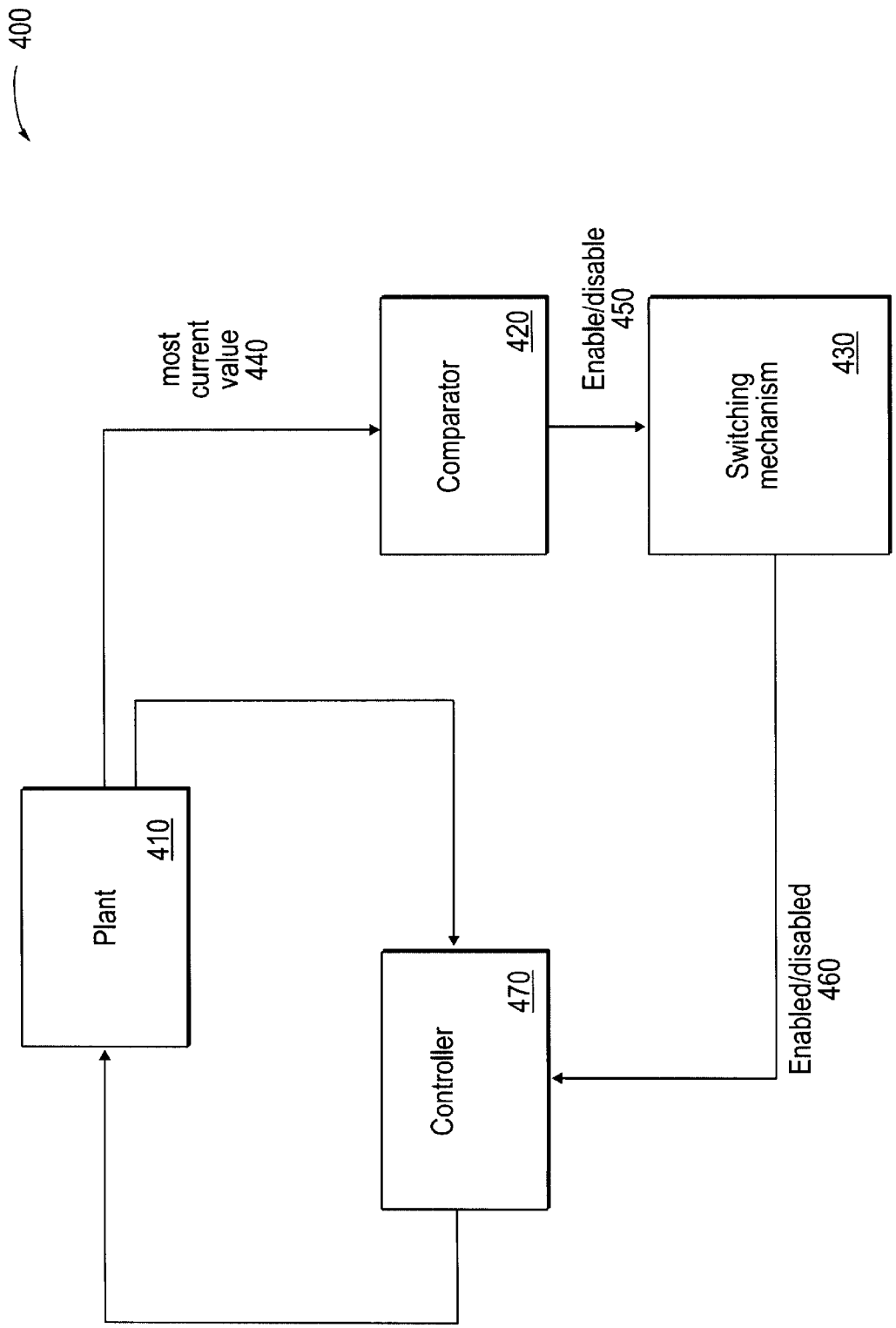
FIG. 4 illustrates a system according to one embodiment of the present invention.

FIG. 4 illustrates a system 400 according to one embodiment of the present invention. System 400 includes a plant 410 which is the device under control, for example the car or the furnace in the examples given above. Coupled to the plant 410 is controller 470. In the furnace example, controller 470 may include more than one controller, each of which operates within a temperature range.

System 400 also includes a comparator 420 which makes the determination if the system 400 is in small signal mode or in large signal mode thus enabling or disabling the switching mechanism 430 of the system 400. The switching mechanism 430 is the mechanism for switching the car in and out of turbo mode or the switching mechanism in the furnace that switches between controllers.

It should be noted that the comparator may be hardware, for example comparator circuitry, or may be software, for example an if-then-else statement. It should also be noted that although the comparator and the switching mechanism are illustrated in FIG. 4 as being separate from the plant and controller either or both may be incorporated into the plant or controller.

The plant 410 provides the most current value of the comparator variable 440 to the comparator 420. In the example of the car the most current value will be the current speed that the car is going. In the furnace example the most current value will be the current temperature of the furnace. The comparator will then perform step 350, discussed above with regard to FIG. 3, to determine if system 400 is in small signal mode or large signal mode. Based upon the results of step 350 the comparator will then send an enable or disable signal 450 to the switching mechanism 430. If the switching mechanism 430 is enabled then the switch will be permitted (460) in the controller 470. If the switching mechanism 430 is disabled then the switch will be prevented (460) in the controller 470.

For a particular system it may be desirable to determine whether the system is in small signal mode or large signal mode by evaluating several distances between comparator variables and final setpoints and comparing those distances to several threshold distances.

For example, a furnace may have several final setpoints, one for each zone of the furnace. In such a case, the furnace may be determined to be in small signal mode if a comparator variable for each zone is within a threshold distance of the final setpoint for each zone of the furnace. Each zone may have its own threshold distance or all zones may share a single threshold distance.

Thus, a method and system for reducing switching transients via large signal/small signal thresholding have been described. Although specific embodiments, including specific equipment, processes, and parameters have been described, various modifications to the disclosed embodiments will be apparent to one of ordinary skill in the art upon reading this disclosure. Therefore, it is to be understood that such embodiments are merely illustrative of and not restrictive on the broad invention and that this invention is not limited to the specific embodiments shown and described.

What is claimed is:

1. A method to reduce switching transients in a system under control comprising:
    determining a final setpoint of a variable under control;
    determining a threshold value of the system under control;
    determining a threshold distance;
    determining a most current value of a comparator variable;
    determining if the system under control is in a small signal mode or in a large signal mode;
    if the system under control is in small signal mode then preventing switching at the threshold value; and
    if the system under control is in large signal mode then permitting switching at the threshold value.

2. The method of claim 1 wherein the step of determining the most current value of the comparator variable and the step of determining if the system under control is in the small signal mode or large signal mode are repeated on an ongoing basis as the system under control operates.

3. The method of claim 1 wherein determining if the system under control is in small signal mode or large signal mode comprises:
    comparing a distance between the most current value and the final setpoint to the threshold distance.

4. The method of claim 3, wherein if the difference between the most current value and the final setpoint is less than the threshold distance then the system under control is in small signal mode, otherwise the system under control is in large signal mode.

5. The method of claim 3, wherein if the difference between the most current value and the final setpoint is less than or equal to the threshold distance then the system under control is in small signal mode, otherwise the system under control is in large signal mode.

6. The method of claim 1 wherein the comparator variable is the variable under control.

7. The method of claim 1 wherein the comparator variable is a variable closely related to the variable under control.

8. The method of claim 1 wherein the system under control includes least one controller.

9. The method of claim 8 wherein the threshold value is the temperature at which the system under control switches from a first controller to a second controller.

10. A system for reducing switching transients in a system under control comprising:
    a comparator; and
    a switching mechanism, wherein the comparator enables or disables the switching mechanism in order to prevent switching transients around a threshold value of the system under control.

11. The system of claim 10 wherein the comparator comprises hardware.

12. The system of claim 10 wherein the comparator comprises software.

13. The system of claim 10 wherein the comparator determines if the system under control is in a small signal mode or a large signal mode.

14. The system of claim 13 wherein the switching mechanism is disabled when the system under control is in small signal mode.

15. The system of claim 13 wherein the switching mechanism is enabled when the system under control is in large signal mode.

16. The system of claim 10 wherein the switching mechanism switches the system under control between a first mode and a second mode.

17. The system of claim 10 wherein the system under control includes a controller.

18. The system of claim 17 wherein the threshold value is a threshold temperature.

19. The system of claim 18 wherein the switching mechanism switches between a first controller and a second controller.

20. A method to reduce switching transients in a system under control comprising:
    determining a final setpoint of a variable under control;
    determining a threshold value of the system under control, wherein the system under control includes a semiconductor furnace and at least one controller;

determining a threshold distance;

determining a most current value of a comparator variable;

determining if the system under control is in a small signal mode or in a large signal mode;

if the system under control is in small signal mode then preventing switching at the threshold value; and if the system under control is in large signal mode then permitting switching at the threshold value.

21. The method of claim 20 wherein the step of determining the most current value of the comparator variable and the step of determining if the system under control is in the small signal mode or large signal mode are repeated on an ongoing basis as the system under control operates.

22. The method of claim 20 wherein determining if the system under control is in small signal mode or large signal mode comprises:

comparing a distance between the most current value and the final setpoint to the threshold distance.

23. The method of claim 22, wherein if the difference between the most current value and the final setpoint is less than the threshold distance then the system under control is in small signal mode, otherwise the system under control is in large signal mode.

24. The method of claim 22, wherein if the difference between the most current value and the final setpoint is less than or equal to the threshold distance then the system under control is in small signal mode, otherwise the system under control is in large signal mode.

25. The method of claim 20 wherein the comparator variable is the variable under control.

26. The method of claim 20 wherein the comparator variable is a variable closely related to the variable under control.

27. The method of claim 20 wherein the comparator variable is temperature.

28. The method of claim 27 wherein the threshold value is the temperature at which the semiconductor furnace switches from a first controller to a second controller.

29. A system for reducing switching transients in a system under control comprising:

a semiconductor furnace;

at least one controller;

a comparator; and a switching mechanism, wherein the comparator enables or disables the switching mechanism in order to prevent switching transients around a threshold value of the system under control.

30. The system of claim 29 wherein the comparator comprises hardware.

31. The system of claim 29 wherein the comparator comprises software.

32. The system of claim 29 wherein the comparator determines if the system under control is in a small signal mode or a large signal mode.

33. The system of claim 32 wherein the switching mechanism is disabled when the system under control is in small signal mode.

34. The system of claim 32 wherein the switching mechanism is enabled when the system under control is in large signal mode.

35. The system of claim 29 wherein the switching mechanism switches the system under control between a first mode and a second mode.

36. The system of claim 29 wherein the threshold value of the semiconductor furnace is a threshold temperature.

37. The system of claim 36 wherein the switching mechanism switches the semiconductor furnace between a first controller and a second controller.

* * * * *

UNITED STATES PATENT AND TRADEMARK OFFICE
CERTIFICATE OF CORRECTION

PATENT NO.    : 6,452,291 B1
DATED         : September 17, 2002
INVENTOR(S)   : Erickson et al.

It is certified that error appears in the above-identified patent and that said Letters Patent is hereby corrected as shown below:

Column 8,
Line 28, after "includes" insert -- at least --.

Signed and Sealed this

Eighteenth Day of February, 2003

JAMES E. ROGAN
*Director of the United States Patent and Trademark Office*